(12) United States Patent
Ellingham, Jr. et al.

(10) Patent No.: US 11,744,190 B2
(45) Date of Patent: Sep. 5, 2023

(54) HORTICULTURAL LIGHTING DEVICE FOR SUSTAINING INDOOR PLANT GROWTH AS WELL AS CORRESPONDING HORTICULTURAL LIGHTING SYSTEM AND METHOD

(71) Applicant: SIGNIFY HOLDING B.V., Eindhoven (NL)

(72) Inventors: Donald Bouton Ellingham, Jr., Waltham, MA (US); James M. Gaines, Lexington, MA (US); Kai Han, Shanghai (CN); Chuan Yuan, Shanghai (CN); Yuefeng Zhang, Buffalo Grove, IL (US)

(73) Assignee: SIGNIFY HOLDING B.V., Eindhoven (NL)

( * ) Notice: Subject to any disclaimer, the term of this patent is extended or adjusted under 35 U.S.C. 154(b) by 339 days.

(21) Appl. No.: 17/059,705

(22) PCT Filed: May 20, 2019

(86) PCT No.: PCT/EP2019/062930
§ 371 (c)(1),
(2) Date: Nov. 30, 2020

(87) PCT Pub. No.: WO2019/228838
PCT Pub. Date: Dec. 5, 2019

(65) Prior Publication Data
US 2021/0212267 A1 Jul. 15, 2021

(30) Foreign Application Priority Data

May 31, 2018 (WO) ................ PCT/CN2018/089257
Jul. 17, 2018 (EP) .................................... 18183949
Mar. 11, 2019 (EP) .................................... 19161866

(51) Int. Cl.
*A01G 7/04* (2006.01)
*H05B 47/115* (2020.01)
(Continued)

(52) U.S. Cl.
CPC ............. *A01G 7/045* (2013.01); *H05B 45/20* (2020.01); *H05B 45/46* (2020.01); *H05B 47/115* (2020.01)

(58) Field of Classification Search
CPC ...... H05B 45/20; H05B 45/46; H05B 47/115; A01G 7/045; A01G 9/20; A01G 9/249
See application file for complete search history.

(56) References Cited

U.S. PATENT DOCUMENTS 9,857,068 B2   1/2018  Nguyen et al.
2006/0006820 A1*  1/2006  Roseman ............... A01G 7/045
                                                              315/312

(Continued)

FOREIGN PATENT DOCUMENTS

CN   203618455 U   6/2014
CN   105538063 A   5/2016
(Continued)

*Primary Examiner* — Abdullah A Riyami
*Assistant Examiner* — Syed M Kaiser

(57) ABSTRACT

A horticultural lighting device for sustaining indoor plant growth, wherein said horticultural lighting device comprises lighting unit arranged for providing illumination in accordance with one of a plurality of modi, wherein, for each modus, said lighting unit is arranged for differentiating in different growth stages of a plant by illuminating in different electromagnetic spectrums, a power unit arranged for receiving an Alternating Current, AC, mains supply voltage and for providing power to said lighting unit, and a control unit arranged for detecting interruptions in said received AC (Continued)

mains supply voltage and for cycling through said plurality of modi for said lighting unit triggered by detected interruptions.

20 Claims, 5 Drawing Sheets

(51) Int. Cl.
*H05B 45/20* (2020.01)
*H05B 45/46* (2020.01)

(56) References Cited

U.S. PATENT DOCUMENTS

2014/0376773 A1* 12/2014 Holz ..................... G06F 3/0304 382/103

2015/0173157 A1* 6/2015 Setomoto ............... H05B 47/19 315/153
2016/0141914 A1* 5/2016 McBryde ............... H05B 45/10 315/161
2018/0070537 A1 3/2018 Vasilenko
2018/0128472 A1 5/2018 Nguyen et al.
2018/0135819 A1* 5/2018 Grandadam ............ F21V 21/02

FOREIGN PATENT DOCUMENTS

| | | | |
|---|---|---|---|
| CN | 106714547 A | 5/2017 | |
| CN | 206377617 U | 8/2017 | |
| DE | 202008004399 U1 * | 7/2008 | ......... H05B 33/0857 |
| EP | 1986469 A1 * | 10/2008 | ......... H05B 33/0857 |
| JP | 2008022711 A | 2/2008 | |
| JP | 2015035429 A | 2/2015 | |
| WO | 2008078277 A1 | 7/2008 | |
| WO | 2016008638 A2 | 1/2016 | |

* cited by examiner

HORTICULTURAL LIGHTING DEVICE FOR SUSTAINING INDOOR PLANT GROWTH AS WELL AS CORRESPONDING HORTICULTURAL LIGHTING SYSTEM AND METHOD

CROSS-REFERENCE TO PRIOR APPLICATIONS

This application is the U.S. National Phase application under 35 U.S.C. § 371 of International Application No. PCT/EP2019/062930, filed on May 20, 2019, which claims the benefit of WO Patent Application No. PCT/CN2018/089257, filed on May 31, 2018, European Patent Application No. 18183949.9, filed on Jul. 17, 2017 and European Patent Application No. 19161866.9, filed on Mar. 11, 2019. These applications are hereby incorporated by reference herein.

FIELD OF THE INVENTION

The present invention generally relates to the field of horticulture and, more specifically, to a horticultural lighting device for sustaining indoor plant growth. The present invention further relates to a horticultural lighting system as well as to a method for operating a horticultural lighting device.

BACKGROUND OF THE INVENTION

Horticulture is a concept directed to the field of growing plants including fruits, vegetables, flowers and any other cultivar.

The present disclosure is directed to a horticultural lighting device that is suitable to be used by consumers, such that the consumers can grow their own plants. A consumer oriented horticultural lighting device may be placed in the living room, kitchen or even in the office. Typically, such devices are used for growing decorative plants, herbs or vegetables in areas of insufficient natural light. Typical dimensions, and a typical weight, of a consumer oriented horticultural lighting device are such that it may be carried by a single person.

In the prior art, where artificial light is the primary growth light source, separate white illuminators may be used to display, inspect and/or harvest plants as specialized grow light spectrums may be visually incomplete, and may be colour-distorting. Sodium light is nearly pure yellow and Light Emitting Diode, LED, lighting is often pink or purple as it may contain mostly photosynthesis targeted wavelengths of blue, and deep red. Those sources are optimized for more efficient use of system input power to plant light absorption in its chlorophyll and does not include the rest of the visible spectrum, which constitutes much of the colour we see reflected off plants and flowers. As a result, vegetation, flowers and fruit may appear a bit strange.

Of earlier light sources, sodium lighting may require certain ballasts, metal halide others, fluorescent yet another, and incandescent no ballast at all. The earlier lighting systems are not electrically compatible or suited to the component and complexity-reduction proposed herein, and for the most part are higher-power devices designed for larger commercial applications. Since they have separate functions in large-scale applications, illuminators in the prior art are to use separate lamps or luminaires, often of entirely different technologies that mandate separate wiring and controls. There is no cost-saving manner to merge those grow and inspection illumination sources.

Commercial grow applications have a requirement for inspection and harvesting purposes, whereas consumer applications require natural white lighting whenever people might be present. Yellow or purple light might be much more efficient for growing plants in the home, but these colours are simply not acceptable for at least some of the time. Well-suited to consumer applications, LED lighting can provide broadband "white" light as well as very specific narrow bands of light, while other light sources cannot provide controllable narrow spectra, without unnecessary waste heat and optical emissions. LEDs are also scalable from one to hundreds of watts and can fit into any bulb or luminaire's enclosure.

White LEDs can replace horticultural LEDs, as the broadband white source for non-grow visual inspection, and are known to have been included in consumer, hobbyist and commercial LED grow lights. Horticulture LEDs are also just appearing in consumer applications such as home tabletop herb gardens. White LEDs are often permanently incorporated into those, so the plants have a more natural appearance in the home.

Unfortunately, those white LEDs defeat the purpose of saving energy as they light the plant even when it is not being viewed, and they do not contribute efficiently to growth. Following the above, there is a need for a consumer-oriented horticultural lighting device that is able to make efficient use of the spectrum for enhancing the growth of plants.

US 2006/006820 A1 discloses a lighting system comprising a light source that emits specific and specialized light spectra and is adjustable through the use of a control interface, which is able to support plants form seedling to mature flowering and fruiting adults. The lighting system utilizes a power source to energize a lighting fixture. A given lighting fixture includes high efficiency luminary devices that may have varying color combinations and spatial arrangements. A substrate provides support and thermal management. Electrical connectors allow multiple lighting fixtures to be connected to a single power source. A switching device allows linear control of intensity, time and color parameters of the emitted light, and is programmable to simulate photoperiods and spectrum shift. The system is optimized to stimulate growth in plants during times of different light-intensity and light-spectrum needs.

SUMMARY OF THE INVENTION

It would be advantageous to achieve a horticultural lighting device that is able to make efficient use of the available spectrum for enhancing the growth of plants. It would also be advantageous to achieve a horticultural lighting system as well as a method for operating the horticultural lighting device.

To better address one or more of these concerns, in a first aspect of the invention, there is provided a horticultural lighting device for sustaining indoor plant growth. The horticultural lighting device comprises:
  a lighting unit arranged for providing illumination in accordance with one of a plurality of modi, wherein, for each modus, said lighting unit is arranged for differentiating in different growth stages of a plant by illuminating in different electromagnetic spectrums;
  a power unit arranged for receiving a mains supply voltage and for providing power to said lighting unit;
  a control unit arranged for detecting interruptions in said received AC mains supply voltage and for switching to a next modus within plurality of modi for said lighting unit triggered by detected interruptions.

It was an insight of the inventors that it would be advantageous to equip a horticultural lighting device with a plurality of modi, wherein said modi are directed to different growth stages of a plant, different growth processes of a plant or different user requirements for the horticulture lighting device. For example, a first modus may be directed to a vegetative growth stage of a plant, a second modus may be directed to a general purpose growth stage of a plant, a third modus may be directed to a flower stage of a plant, etc. Different growth processes in a plant may include plant photosynthesis, photoperiodism, phototropism, photomorphogenesis, ripening, etc. Different user requirements may include visual display of a plant, inspection of a plant, etc.

Alternatively or additionally to the power interruption switching, the horticultural lighting device comprises:
- a motion detector arranged for detecting moving objects; and
- a control unit arranged for switching to a motion modus within said plurality of modi for said lighting unit trigged by detecting of a moving object by said motion detector.

The motion detector may be based on Passive infrared technogology, microwave technology, Ultrasonic technology, Tomographic technology, video camera technology or anything similar.

It was found that a user may perceive the different modi as hinderous due to the different colours of the light emitted by the lighting unit. As such, the horticultural lighting device, more specifically the lighting unit, may be arranged to provide illumination in a motion modus. This particular illumination may be taylored such that the user does not perceive that particular illumination as hinderous. Additionally or alternatively, presence of an object may be detected instead of motion of an object.

The motion modus is set, i.e. activated, once a moving object is detected. The moving object is, for example, a human being. The motion detector is thus arranged for detecting moving objects, i.e. in the vicinity of the horticultural lighting device. Moving objects may thus be detected in the surroundings of the horticultural lighting device. A detected moving object may suggest the presence of a person and, as such, the horticultural lighting device switches the lighting unit to a motion modus.

The motion modus may be considered a presence modus as the modus may indicate the presence of a person in the vicinity of the horticultural lighting device. Therefore, in embodiments the motion detector may be a presence detector for detecting presence of an object.

In an example, in said motion modus, said lighting unit is arranged for providing illumination having a substantially broadband electromagnetic spectrum component.

Once the horitcultural lighting device is in the motion modus, it suggests there is a peron present in the vicinity of the horticultural lighting device. As such, it may be beneficial that the lighting unit is set to provide illumination having a substantially broadband electrogmagnetic spectrum componen, i.e. a white based lighting. The person may perceive such a colored illumination as comfortable.

In a further example, the motion detector is arranged to operate according to at least one of a Doppler effect noticeable between transmitted and received radio waves; and a fluctuation in received signal strength of received radio waves.

In another example, said control unit is arranged for switching to said motion modus, from a grow modus, for a predetermined amount of time triggered by detecting of said moving object by said motion detector.

For example, once motion is detected, by the motion detector, the motion modus may be set for five minutes, ten minutes, thirty minutes, or anything alike. Once the predetermined amount of time has lapsed for example without being re-started through subsequent motion detection during the pre-selected time-out period, the control unit may set the lighting unit to an initial modus, for example said growth modus, or anything alike. In the growth modus, the illumination may have a different colour, i.e. a colour that is taylored to the growth phase of the plants.

In an embodiment, the switching to the motion/presence modus upon detection of motion/presence may be disabled such that the horticulture lighting device is only adapted to switch modi upon detection of power interruptions. In an embodiment, the switching to the motion/presence modus may be performed only upon initial detection of motion/presence and may then be disabled for the remainder of the motion/presence detected or a predetermined time period, after which a new motion/presence detection again causes the controller to switch to the motion/presence modus. The enabling/disabling of motion/presence detection features may be determined by the controller though a user interaction (e.g. a toggle switch, dip switch setting, a specific sequence of power interruptions, etc.).

It would further be beneficial if the different modi can be selected by a user without the use of a remote control, or without installing any kind of additional switch in the home. As such, the inventors found the solution that a switch, for turning the lighting device on and off, can also be used to convey instructions to the lighting device. More specifically, it is possible to cycle through, i.e. select a next modus, the modi of the lighting device by subsequently interrupting the AC mains supply voltage provided to the lighting device.

Using the method as described above, a particular user is able to efficiently set a modus of interest for the lighting device. The user is, for example, able to select the modus that, according to him or her, corresponds to the growth stage of the plant, a desired growth processes of a plant or a desired user requirements for the horticulture lighting device.

In accordance with the present disclosure, the control unit may be directed to the detection of interruptions in the received AC mains supply voltage as disclosed above, may be directed to the concept of switching to said motion modus when a moving object is detected or may be directed to a combination of both.

The horticultural lighting device comprises a power unit arranged for receiving an AC mains supply voltage and for providing power to said lighting unit. Such a power unit may, for example, be based on a rectifier.

A rectifier may comprise four switching elements. These switching elements may either be non-controllable—like a diode—, or controllable, like a Metal Oxide Semiconductor Field Effect Transistor, MOSFET, a thyristor or anything alike. For the purpose of the present disclosure, the switching elements are referred to as diodes, but it is noted that they may be replaced by other equivalent controllable or non-controllable switches with suitable additional control equipment where necessary.

The horticultural lighting device further comprises a lighting unit arranged for providing illumination in accordance with one of a plurality of modi. Preferably, Light Emitting Diodes, LED's, are used for providing the illumination. For example, multiple arrays of LED's may be used wherein each array is associated with a particular modus of the horticultural lighting device. For example, a first array of LED's may be directed to provide illumination in a first electromagnetic spectrum, a second array of LED's may be directed to provide illumination in a second electromagnetic spectrum, a third array of LED's may be directed to provide illumination in a third electromagnetic spectrum, etc. By separately controlling each of the arrays, a particular modus may be set for the lighting device, i.e. a particular growth stage may be chosen.

The horticultural lighting device further comprises a control unit arranged for detecting interruptions in said received AC mains supply voltage and for cycling through said plurality of modi for said lighting unit triggered by detected interruptions. Such a control unit may be implemented as a microcontroller, an Application Specific Integrated Controller, ASIC, an Field Programmable Gate Array, FPGA, analogue or digital electronic circuitry, or anything alike.

The control unit may detect the interruptions directly in the received AC mains supply or may detect the interruptions based on the output provided by the power unit. In any case, the control unit is able to determine that the AC mains supply voltage disappears for a particular amount of time, and then re-appears again. The horticultural lighting device in accordance with the present disclosure is suitable for the consumer oriented market. As such, the dimensions, the weight and the operating of the device should be such that it can be handled by an end user, i.e. a consumer.

In one or more of said plurality of modi, said lighting unit may be arranged for providing illumination having at least one of:
  a substantially blue based electromagnetic spectrum component for enhancing vegetation growth of a plant;
  a substantially deep red based electromagnetic spectrum component to promote flowering of a plant;
  an ultraviolet, UV, supplemented electromagnetic spectrum component;
  a substantially white spectrum for the purpose of visual display and inspection of a plant for diseases; and
  a far-red supplemented, substantially deep-red based electromagnetic spectrum component for enhanced flower promotion and fruiting stem elongation.

The above provided examples are directed to the different growth stages of a plant, different growth processes of a plant (such as photosynthesis, photoperiodism, phototropism, photomorphogenesis, ripening, etc.) or different user requirements for the horticulture lighting device (such as visual display of a plant, inspection of a plant, etc.). The inventors have found that during growth of a plant, the plant may require different illumination patterns. That is, a different light spectrum may be provided to the plant during its growth to a mature plant.

In accordance with the present disclosure, a substantially blue based electromagnetic spectrum component may be directed to wavelength ranges of 400 nm to 500 nm. A substantially deep red based electromagnetic spectrum component may be directed to wavelength ranges of 640 nm-700 nm. An ultraviolet, UV, supplemented electromagnetic spectrum component may be directed to wavelength ranges of 280 nm-400 nm.

Other, or additional, options may be directed to red light having wavelength ranges of 600 to 700 nm, including a more specific deep red having wavelength ranges of 650 to 670 nm, far red light having wavelength ranges between 700 to 800 nm, UVA light having wavelength ranges between 315 to 400 nm, UVB light having wavelength ranges between 280 to 315 nm.

The substantially white spectrum, i.e. the broadband electromagnetic spectrum, may be used for the purpose of visual display and inspection of a plant for diseases. Using a substantially white spectrum, a consumer is able to identify, visually, any diseases or other irregularities that are present on a plant.

In an example, the lighting unit comprises a string of Light Emitting Diodes, LED's, and a plurality of switches, wherein each of said plurality of switches is arranged for introducing, or removing, one or more (additional) LED's to said string of LED's, and wherein said control unit is arranged for activating one or more of said plurality of switches for selecting a modus of said plurality of modi.

The above described example provides for an efficient implementation. Often, it may occur that LEDs are shared between different modi. These shared LED's may then be placed in a string of LED's that are always activated, i.e. for each modus. Depending on the specific modus that is set, additional LED's are introduced into the string. Alternatively, one or more LED's are removed from the string of LED's or a combination thereof.

In a further example, the lighting device further comprises:
  an electrical supply unit arranged for storing electrical energy and for providing power to said horticultural lighting device, more specifically at least to the control unit, during interruptions occurring in said AC mains supply voltage.

The electrical supply unit may, for example, be a large capacitor or an array of capacitors for buffering electrical energy. The lighting unit as well as the control unit may then be powered by the electrical supply unit during an interruption in the AC mains supply voltage.

It is noted that the electrical supply unit has a finite amount of energy that can be stored. As such, the lighting device will be shut down in its entirety in case the duration of the interruption is longer that the total amount of time that the lighting unit and the control unit can survive from the electrical supply unit alone.

Typically, the capacity of the electrical supply unit is chosen such that the electrical supply unit is able to provide sufficient energy to the control unit for at least ten seconds, preferably at least twelve seconds.

It is noted that, preferably, the electrical supply unit provides power to the control unit and the power unit but not necessarily to the lighting unit. According to the present disclosure, however, the electrical supply unit may, alternatively, also provide power to the lighting unit during the interruptions.

In a further example, the control unit is further arranged for determining a duration of a detected interruption in said received AC mains supply voltage, and for:
  setting a predefined modus of said plurality of modi when said determined duration is within a predefined range from a first predetermined duration to a second predetermined duration and the mains voltage is subsequently interrupted for a second time meeting with a second determined duration of the subsequent interruption in said AC mains supply voltage within said predetermined range;
  setting a next modus of said plurality of modi when said determined duration is within a next range from a third predetermined duration to a fourth predetermined duration.

The inventors have found that it is possible to convey information to the horticultural lighting device by the sequence of interruptions, or by the duration of the interruptions in the AC mains supply voltage. For example, it may be determined that a next modus of said plurality of modi is selected whenever the duration of the detected interruption exceeds a predetermined duration threshold, for example three seconds. A predefined modus of said plurality of modi may be selected in case the duration is less the duration threshold, for example three seconds.

Yet another option is that a particular user conveys information to the horticultural lighting device based on an ON/OFF keying sequence. On-off keying, OOK, denotes a simple form of amplitude-shift keying, ASK, modulation that represents digital data at the presence or absence of a carrier wave, which is in this case the AC mains supply voltage.

In a further example, the horticultural lighting device comprises:

a memory for storing a most recently set modus for said lighting unit, and wherein said control unit is further arranged for retrieving said most recent modus from said memory, and for setting said lighting unit in said most recent modus, when triggered by applying said mains supply voltage to said device.

The above described example may be beneficial for remembering the last set modus of the horticultural lighting device before the device was turned off. Turning the lighting device back on again will ensure the lighting device to go into the last known modus, i.e. the one present in the memory of the device.

In a further example, the power unit is a single channel power unit having a single channel output for providing power to said lighting unit.

A single channel output means that the power unit has a single output for providing power to the lighting unit.

The advantage of the above described example is that the implementation of the power unit may be kept efficient and cost friendly.

It may further be the case that, in each modus of said plurality of modi, a difference in total voltage drop over said LED's is less than 10%, preferably less than 5%, for reducing an output voltage range swing of said power unit.

In an example, the control unit is further arranged for detecting a particular sequence of interruptions in said received AC mains supply voltage, and for setting an initial modus of said plurality of modi upon detecting said particular sequence.

In yet a further example, the control unit is further arranged for detecting different sequences of interruptions in said received AC mains supply voltage, and for controlling said lighting unit according to the detected sequence of interruptions. More specifically, the length, i.e. duration, of an interruption may be used for controlling the lighting unit. In case the duration of a particular detected interruption does not correspond to a predefined setting, i.e. the length of the duration is unknown to the control unit, the control unit may discard that particular detected interruption.

In a second aspect of the present disclosure there is provided a horticultural lighting system arranged for sustaining indoor plant growth, wherein said horticultural lighting system comprises:

a horticultural lighting device in accordance with any of the examples as provided above, and;

a switch for switching said AC mains supply voltage.

It is noted that the advantages and definitions as disclosed with respect to the examples of the first aspect of the invention also corresponds to the examples of the second aspect of the invention, being the horticultural lighting system.

The switch may be a wall mounted, or mountable, switch for regulating whether electrical power is provided to the horticultural lighting device, or may be a switch present in a power supply cord to the horticultural lighting device or a switch present in the horticultural lighting device itself.

In a third aspect, there is provided a method of operating a horticultural lighting device in accordance with any of the horticultural lighting device examples as provided above, wherein said method comprises the steps of:

providing, by said lighting unit, illumination in accordance with one of a plurality of modi, wherein, in each modus, said lighting unit is arranged for differentiating in different growth stages of a plant, different growth processes of a plant or different user requirements, by illuminating in different electromagnetic spectrums;

receiving, by said power unit a mains supply voltage and providing, by said power unit, power to said lighting unit;

detecting, by said control unit interruptions in said received mains supply voltage and, switching to, by said control unit, a next modus within said plurality of modi for said lighting unit triggered by detected interruptions.

It is noted that the advantages and definitions as disclosed with respect to the examples of the first and second aspects of the inventions also correspond to the third aspect of the invention, being the method of operating a horticultural lighting device.

In an example, the lighting unit comprises a string of Light Emitting Diodes, LED's, and a plurality of switches, wherein each of said plurality of switches is arranged for introducing, or removing, one or more additional LED's to said string of LED's, and wherein said method comprises the step of:

activating, by said control unit, one or more of said plurality of switches for selecting a modus of said plurality of modi.

In a further example, the lighting device further comprises an electrical supply unit, wherein said method comprises the steps of:

storing, by said electrical supply unit, electrical energy, and providing, by said electrical supply unit, power to said horticultural lighting device during interruptions occurring in said AC mains supply voltage.

In another example, the control unit is further arranged for determining a duration of a detected interruption in said received AC mains supply voltage, and wherein said method comprises the steps of:

setting a predefined modus of said plurality of modi when said determined duration is within a predefined range from a first predetermined duration to a second predetermined duration and the mains voltage is subsequently interrupted for a second time meeting with a second determined duration of the subsequent interruption in said AC mains supply voltage within said predetermined range;

setting a next modus of said plurality of modi when said determined duration is within a next range from a third predetermined duration to a fourth predetermined duration.

In yet another example, the device further comprises a memory for storing a currently set modus for said lighting unit, and wherein said method comprises the step of:

retrieving, by said control unit, said stored modus from said memory, and setting said lighting device to said retrieved modus, triggered by turning said lighting device on.

In a further example, the method further comprises the steps of:

detecting, by said control unit, a particular sequence of interruptions in said received AC mains supply voltage, and setting, by said control unit, an initial modus of said plurality of modi upon detecting said particular sequence.

In a fourth aspect, there is provided a computer program product comprising a computer readable medium having instructions which, when executed by a horticultural lighting device, cause said lighting device to implement a method in accordance with any of the method examples as provided above.

These and other aspects of the invention will be apparent from and elucidated with reference to the embodiment(s) described hereinafter.

DETAILED DESCRIPTION

A detailed description of the drawings and figures are presented. It is noted that a same reference number in different figures indicates a similar component or a same function of various components.

Figure 1:
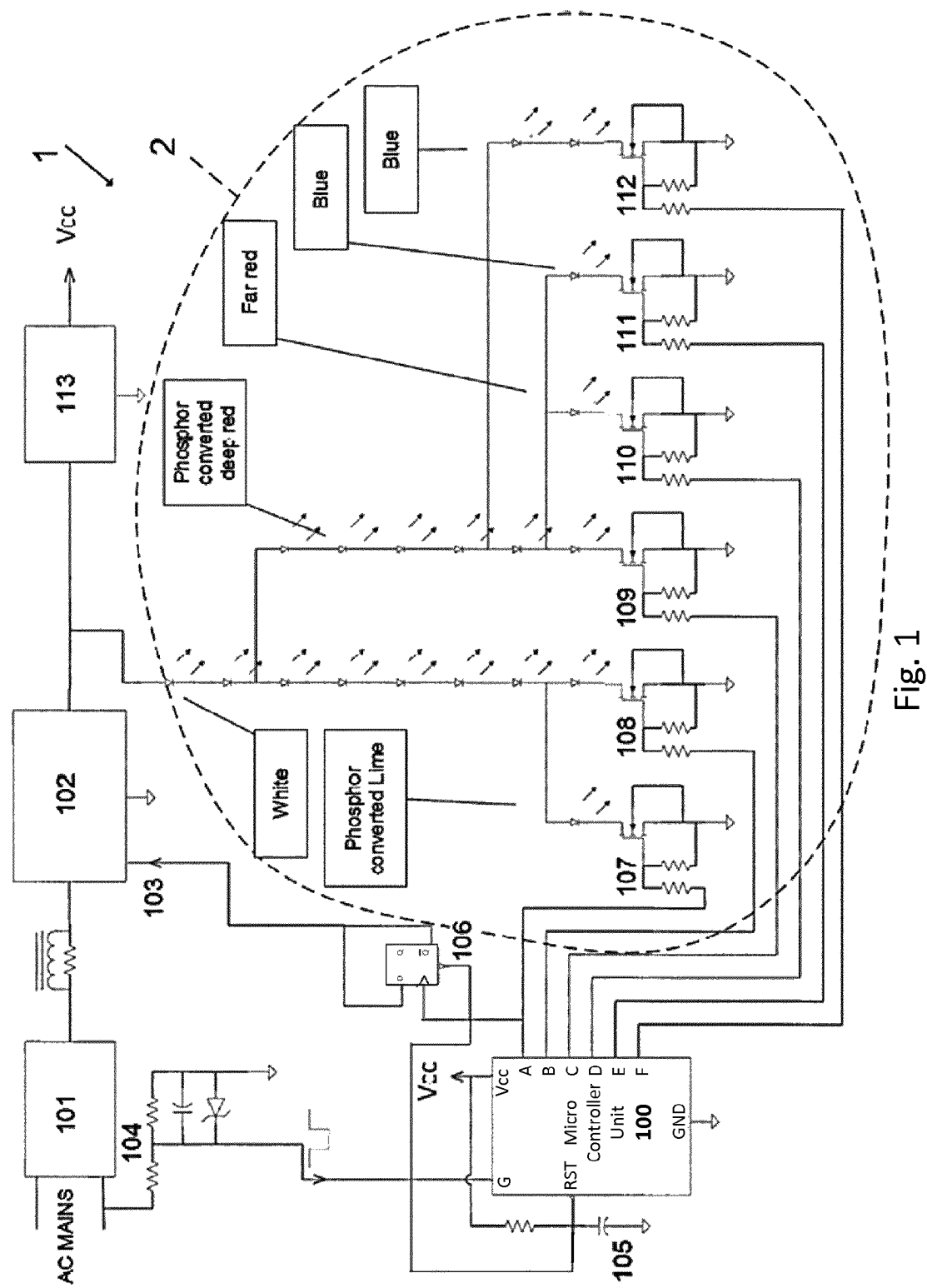
FIG. 1 shows an electrical circuit diagram in accordance with an example of the present disclosure.

FIG. 1 shows an electrical circuit diagram 1 of a horticultural lighting device in accordance with the present disclosure. The horticultural lighting device is suitable for sustaining indoor plant growth. That is, a consumer intends to use the horticultural lighting device at home or in the office. For example, the horticultural lighting device may be a table-top device, suitable to be handled, for example carried, by a single person.

The horticultural lighting device comprises a lighting unit 2, a power unit 101 and a control unit 100. These elements are explained in more detail here below.

The lighting unit 2 is arranged for providing illumination in accordance with one of a plurality of modi, wherein, for each modus, the lighting unit is arranged for differentiating in different growth stages of a plant, different growth processes of a plant or different user requirements, by illuminating in different electromagnetic spectrums. The differentiation is thus accomplished by selecting different illumination patterns. For example, the inventors have found that, during the growth of a plant, the plant may require different illumination patterns. The patterns focus on different wavelength illumination, i.e. different coloured illumination, that is provided to the plant. A first pattern may be directed to an early stage growth stage of the plant. A second pattern may be directed a second growth stage of the plant, etc.

In accordance with the present disclosure, the horticultural lighting device may be suitable to be used for plants, which include, amongst other, decorative varieties, herbs, fruits, vegetables, flowers, and any other cultivar.

In the specific example shown in FIG. 1, six different modi may be recognized. A modus may be set by activating one of the switches 107-112, respectively.

The control unit 100 is responsible for controlling these switches 107-112. These switches 107-112 may be implemented as transistors or Field Effect Transistors, FET's, or anything alike.

The lighting unit comprises a string of Light Emitting Diodes, LED's, and the plurality of switches 107-112, wherein each of the plurality of switches is arranged for introducing one or more additional LED's to the string of LED's, and wherein the control unit is arranged for activating one or more of the plurality of switches for selecting a modus of said plurality of modi.

The LED's that are introduced to the string of LED's may be specific, i.e. tailored, to a growth phase of the plant. For example, phosphor converted lime LED's may be introduced, phosphor converted deep red LED's may be introduced, far red LED's may be introduced, as well as blue LED's may be introduced.

The power unit 101 is arranged for receiving an Alternating Current, AC, mains supply voltage and for providing power to the lighting unit. The AC mains supply voltage is, for example, the 230 Vac or 120 Vac or anything alike. The AC mains supply voltage may be the voltage that is provided to the horticultural lighting device by the electrical installation that is present in the building.

The power unit 101 is arranged for providing power to the lighting unit 2. In the present case, a dual-current switching power supply 102 is integrated for converting the rectified AC mains supply voltage, provided by the power unit 101, into a current source for powering the LED's.

The control unit 100 is arranged for detecting interruptions in the received AC mains supply voltage and for cycling through the plurality of modi for the lighting unit triggered by detected interruptions. The control unit 100 is able to detect interruptions in the AC mains supply voltage via the detection circuit 104.

Here below, a more detailed description of the lighting device in accordance with the present disclosure is provided, which detailed description is provided by means of example without limiting the present disclosure to this specific example.

The power unit 101, in combination with the dual-current switching power supply 102, accommodates the desired AC mains input voltage range and convert it to a constant current at a voltage which is high enough to accommodate the sum of the highest forward voltage LED string, and the voltage drop through all switches used, in the worst case.

The output voltage maximum may equal the sum of those, plus a guard band, for example of about 2 volts, to accommodate manufacturing tolerances for all of the components in each LED string, and their switches.

It is beneficial if there is sufficient output voltage to accommodate the effects of thermal extremes of the completed lighting devices including all the related internal components, to keep the LEDs properly driven. For efficiency, close to the full output of the power supply may be used and the voltage out may be as high as possible, with LED strings as long as possible.

It Is beneficial if, during the design of the constant current power supply, the process of LED string switching is considered. Depending on the control unit design, it is possible that during switching, there may briefly be no load on the supply and its output capacitor may charge to a higher voltage than normal, there may be an electronic clamp circuit on this voltage, to prevent the stored energy of said capacitor from damaging newly-connected LEDs with a current spike.

The control integrated circuit is most easily implemented with a small microcontroller or MCU 100, though is simple enough to be made in a custom chip using counters. The clock oscillator within the MCU can determine all timing for the pulse-width determination, and control execution. A 6-output MCU 100 is shown for clarity, however because only one MCU output is high at a given time, a lower cost MCU may be used. For instance, the LED-switching FET's 107-112 may be driven by either a 1 of 8 decoder controlled by 3 MCU outputs, or a serial in, parallel out shift register using 2 outputs to drive its clock and clear. Both of those approaches can allow an 8-pin MCU to control sophisticated, many-colour grow lights.

Within the MCU 100 implementation, a reference oscillator may provide the timing for the circuit. The AC mains supply voltage may not be used as the timing source as the interruptions being timed are devoid of sine waves. The oscillator may be divided down by either provided pre-scaling in the MCU 100, or divided in counting loops in software. A timing frequency of 64 Hz would allow for counting 8 pulses during the shortest pulse of interest, if the period of that shortest pulse was ⅛ second, as shall be used in the example of FIG. 1. The longest period in that figure is 8 seconds, or 512 counts. If the power is interrupted for that period or longer, the current modus is written to an internal non-volatile memory for use in the next daylight cycle, which might be manually-enabled through a power switch by the user, or automatic as controlled by a programmable timer.

The programmable timer may, for example, also work with a daily schedule. The programmable timer ensures that interruptions in the mains power supply occur, which interruptions should follow a predefined, programmed, cycle for cycling through different stages of illumination of the plant during the day. It is noted that a single programmable timer may be used in combination with a plurality of lighting devices in accordance with the present disclosure.

Figure 2:
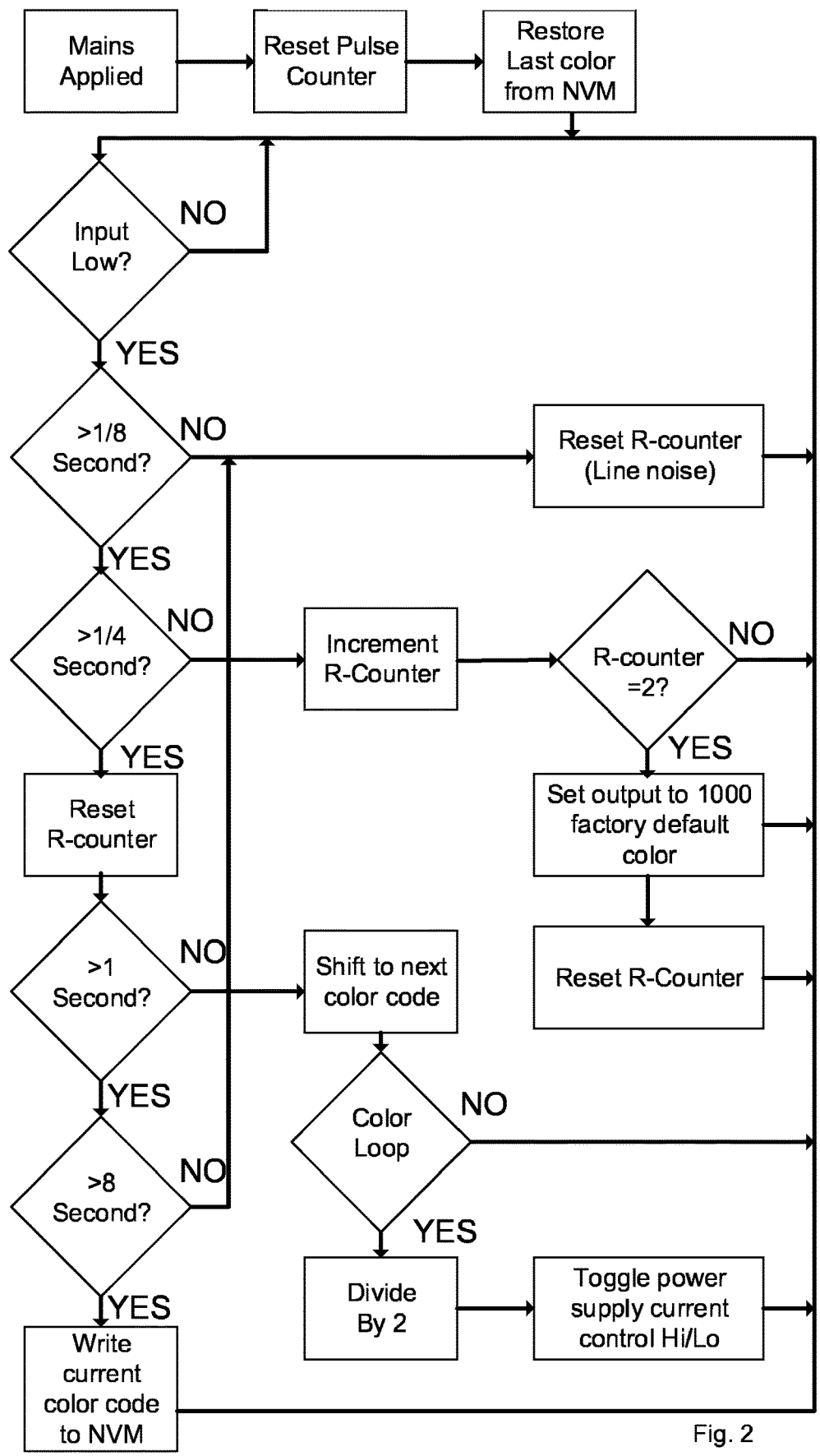
FIG. 2 shows a flow chart of a method in accordance with an example of the present disclosure.

The MCU code may be contained in non-volatile Read Only Memory, ROM, and may execute a program similar to the flow chart as illustrated in FIG. 2. The MCU 100 may use bipolar or MOS switching transistors arranged to place various LEDs in-series. These transistors could be incorporated into the MCU but are moderately high voltage devices, so may be more cost effectively external, on the circuit board.

The LEDs could include any chemistry LED at the cost of efficiency and flux output. To achieve an improved result, in a preferred embodiment, it would be advantageous to select LEDs all using a similar forward voltage, Vf, for example 3-3.2 Vf InGaN LED with no phosphor (for blue ~450 nm), and others with various phosphors creating white, PClime, PCamber, PCred and PCdeep red spectrums.

Other LEDs outputting narrow-band deep red (660 nm Vf~2.1 Vf), far red (730 nm ~1.8 Vf) and UVA (365-399 nm) may have differing Vf from the rest, and complicate string-matching. Pure red LEDs (AlInGaP variants) typically have a lower forward voltage (~2.2V) and a "backward" Vf vs Tj (junction temperature) curve, making regulating spectrum more difficult, though for a consumer product this may not be important if reasonably stable. UV LEDs typically have a "proper" Vf vs Tj curve but Vf as high as 4.5V, making string-matching more difficult. UV LEDs also have shorter lifetimes as of this writing, so should be avoided until they improve.

In an example, the LEDs may be mid or even low-power types. High-power LEDs are very costly in units of flux output vs cost. Using many smaller, lower power LEDs assures high Vf strings, enough LEDs over the face of the lamp to allow good colour-mixing, as well as distributes heat more evenly over the heat sink surface.

The lighting unit may be adapted to generate far red (720-740 nm), deep red (650-670 nm) and royal blue (445-455 nm), but also lime. The lighting unit may be adapted to generate far red (730 nm), deep red (660 nm) and blue (450 nm), but also green and cool white. The lighting unit may be adapted to generate deep blue (450 nm), hyper red (660 nm), far red (730 nm), but also white. The lighting unit may be adapted to generate deep blue (449-461 nm), deep red (646-665 nm), far red (730 nm), but also UVB, UVA and white.

For example, one of the switches as indicated with reference numerals 107-112 may be activated. Switch 107 may enable seven white LED's and 1 PC lime LED for viewing purposes and for enhanced green purposes. Switch 108 may enable eight white LED's for viewing purposes. Switch 109 may enable two white LED's and six PC DR LED's for flowering purposes. Switch 110 may enable two white LED's and five PC DR LED's and one FR LED for enhanced flowering purposes. Switch 111 may enable two white LED's and five PC DR LED's and one blue LED for general grow purposes. Switch 112 may enable two white LED's and four PCDR LED's and two blue LED's for vegetative purposes.

In the circuit shown in FIG. 1, a 10 pin, 8 I/O MCU 100 is shown implementing a 6-modi design. Using a 10 pin, 6 I/O may eliminate 2 of the possible modi. The AC mains supply voltage is rectified 101 and fed to a switching converter 102 with constant current output, with an input control 103 producing a low-current level on demand. The input mains is also divided, filtered, ½ wave rectified and clamped 104 to the Vcc level and fed into MCU 100 input G.

This network may create clean pulses from the mains when the input is toggled. A reset circuit 105 at Input/Output, I/O, pin RST provides the power-up reset for the MCU. A D-type flip-flop 106 selects between high and low LED current output from the dual-current switching power supply 102, i.e. it controls the output current and an array of FETs 107-112 performs low-side LED switching forming the different modi of the lighting device 1. A 10-second hold-up supply 113, i.e. an electrical supply unit arranged for storing electrical energy and for providing power to the horticultural lighting device, more specifically to the control unit 100, during interruptions occurring in the AC mains supply voltage, may keep the MCU 100 running for that long after the mains AC supply voltage is cut, i.e. interrupted, allowing a proper power-down sequence.

The AC mains supply is thus full-wave rectified 100 and powers the switching supply 102. It may be designed for high-power operation, but may also have a low-power mode.

The mains-pulse forming circuit 104 may be voltage-divided by the provided resistors and then clamped, by the Zener diode, at the Vcc voltage level. Any remaining negative dips between half-sines are noise-filtered out by the capacitor to ground and sent to the I/O pin G, and a clean low-pulse represents the mains off-time. The switching supply 102 may provide an open-circuit voltage capability of a few volts more than the maximum voltage ever required by the string of LEDs, in all its transistor-selectable connection options.

The 10-second hold-up supply 113 may be created with an electrolytic capacitor, charge-limiting resistor and Zener diode to limit the output voltage to the intended Integrated Circuit, IC, Vcc requirement. As CMOS MCUs can draw under a milliamp, and more likely microamperes, the circuit does need not be complex or large. This circuit keeps the IC running long enough to complete the last-state storage in Non Volatile Memory, NVM, on a power-down.

When the AC mains supply voltage is activated for the first time, the switching supply comes up to full output and the hold-up supply may regulate the Vcc voltage for the MCU 100. The Reset circuit 105 may hold the input RST low long enough to allow full voltage at Vcc, the internal oscillator to stabilize, internal registers to initialize and the power-control flip-flop 106 to be reset, putting a logic high into the low power control 103. The MCU 100 may then initialize internally and the factory-default modus may be recovered from the NVM and a high may be placed on MCU output A.

This, in-turn, may clock a high into the power control flip-flop bringing the low power control line low, enabling high power mode. Output A enables FET 107 which places the Lime LED in series with the top 7 white LEDs, and powers that string. When power is cycled, the power is completely interrupted and the pulse forming circuit generates a logic zero into the MCU, where the internal program starts a timer, following the flow chart of FIG. 2, in accordance to the timing diagram of FIG. 3. If the pulse is less than ⅛ second, the input may be considered noise, the internal counters are reset, and the processor returns to monitoring the input pin G. If greater than ⅛ second and less than ¼, it is taken as the first half of a "reset to factory-modus" command in the R-Counter. Repeating this width pulse completes the command, however following the first accepted R-Counter pulse with a pulse shorter than ⅛ second or longer than ¼ second may be considered noise and the R-Counter resets.

FIG. 2 shows a flow chart of a method in accordance with an example of the present disclosure.

The flow chart initiates with an AC mains supply voltage being applied to the horticultural lighting device. This may be accomplished, for example, using a wall mounted switch. In other words, the horticultural lighting device is turned on, i.e. activated. The pulse counter may then be reset and the last known modus of the lighting device may be retrieved, and set, from an internal memory.

The lighting device then starts illuminating the plants based on the last known modus. The control unit will, continuously, in an initial phase, check whether there is an interruption in the AC mains supply voltage. The duration of an interruption may be determined once an interruption is detected.

In the present scenario, in case the duration is less than ⅛ of a second, the R-counter is reset and the control unit returns to the initial phase. In case the duration is more than ⅛ of a second, but less than ¼ of a second, the counter is incremented. The control unit is placed back into its initial phase in case the counter does not equal a predefined number, for example 2. Otherwise, the lighting device is set to a default modus, the counter is reset, and, subsequently, the control unit is placed back to its initial phase.

In the present scenario, in case the duration is more than ¼ of a second, but less than 1 second, the counter is reset and a next modus of the plurality of modi is selected before turning the control unit to its initial phase again.

In case the duration is more than 1 second, but less than 8 seconds, the counter may be reset and the control unit may be placed into its initial phase.

In case the duration is more than 8 seconds, the current modus may be stored in the memory, which may then subsequently be used once the lighting device is turned on again, for example, the next day.

Figure 3:
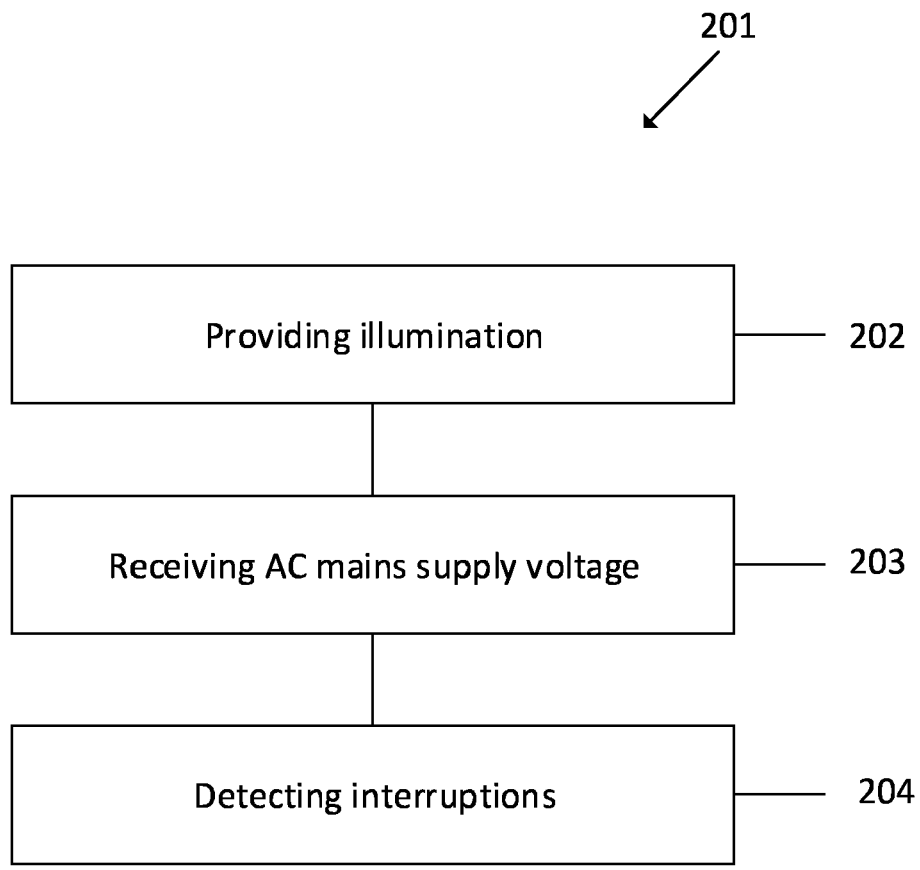
FIG. 3 shows a flow chart of a method in accordance with another example of the present disclosure.

FIG. 3 shows a flow chart of a method in accordance with another example of the present disclosure.

The method 201 is directed to the operating of a horticultural lighting device in accordance with any of the examples as provided above. The method comprises the steps of:

providing 202, by said lighting unit, illumination in accordance with one of a plurality of modi, wherein, in each modus, said lighting unit is arranged for differentiating in different growth stages of a plant, different growth processes of a plant or different user requirements, by illuminating in different electromagnetic spectrums receiving 203, by said power unit an Alternating Current, AC, mains supply voltage and providing, by said power unit, power to said lighting unit;

detecting 204, by said control unit interruptions in said received AC mains supply voltage and, cycling through, by said control unit, said plurality of modi for said lighting unit triggered by detected interruptions.

Figure 4:
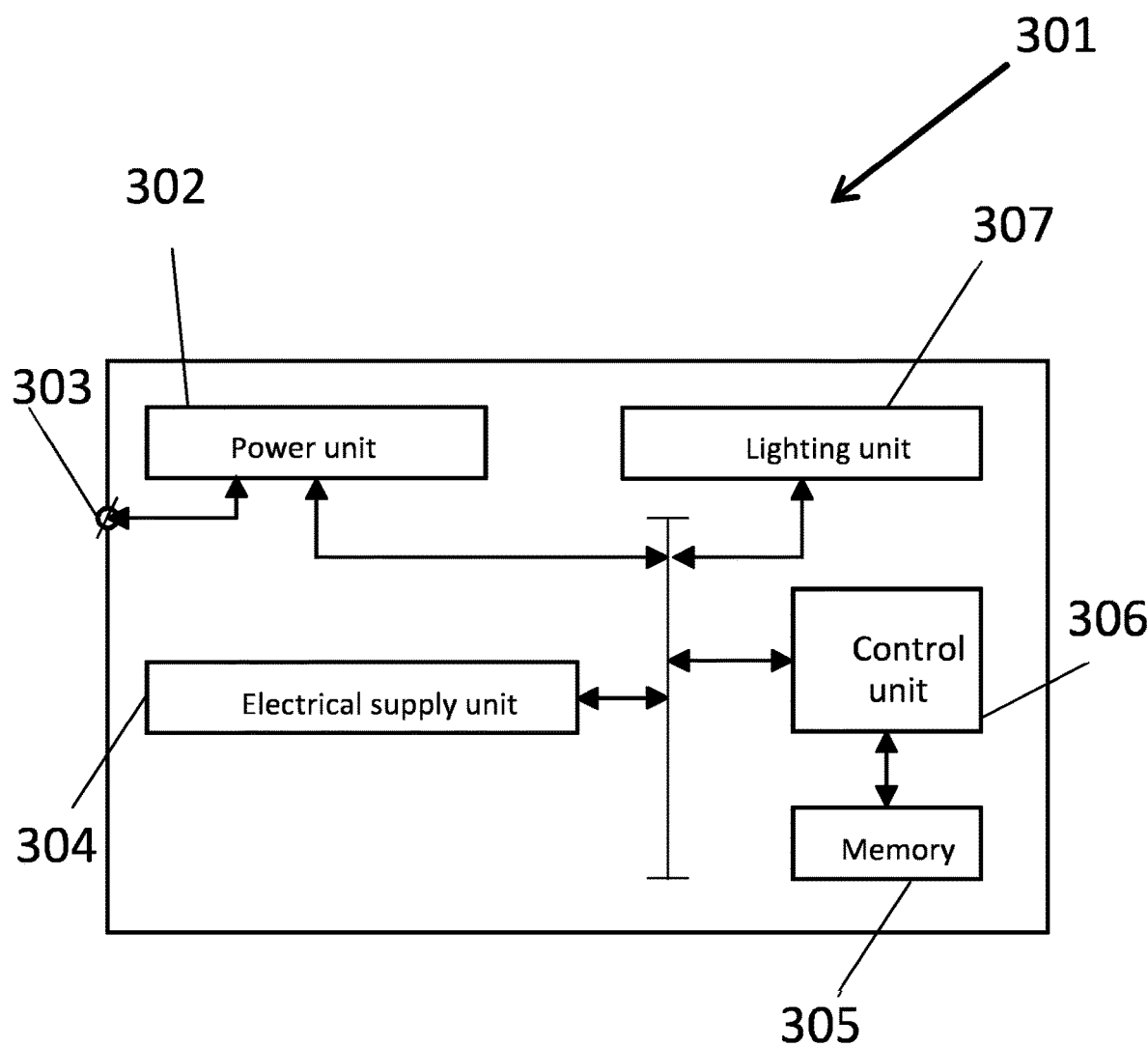
FIG. 4 shows an example of a lighting device in accordance with an example of the present disclosure.

FIG. 4 shows an example of a lighting device in accordance with an example of the present disclosure.

The horticultural lighting device 301 is suitable for sustaining indoor plant growth, wherein said horticultural lighting device 301 comprises:

a lighting unit 307 arranged for providing illumination in accordance with one of a plurality of modi, wherein, for each modus, said lighting unit is arranged for differentiating in different growth stages of a plant, different growth processes of a plant or different user requirements, by illuminating in different electromagnetic spectrums;

a power unit 302 arranged for receiving an Alternating Current, AC, mains supply voltage and for providing power to said lighting unit;

a control unit 306 arranged for detecting interruptions in said received AC mains supply voltage and for cycling through said plurality of modi for said lighting unit triggered by detected interruptions.

Further a memory 305 is provided for storing the last known modus of the lighting device 301. An electrical supply unit is provided for providing power to the lighting device 301 during interruptions in the AC mains supply. Finally, a connector 303 is provided for connecting the AC mains power supply line thereto.

Figure 5:
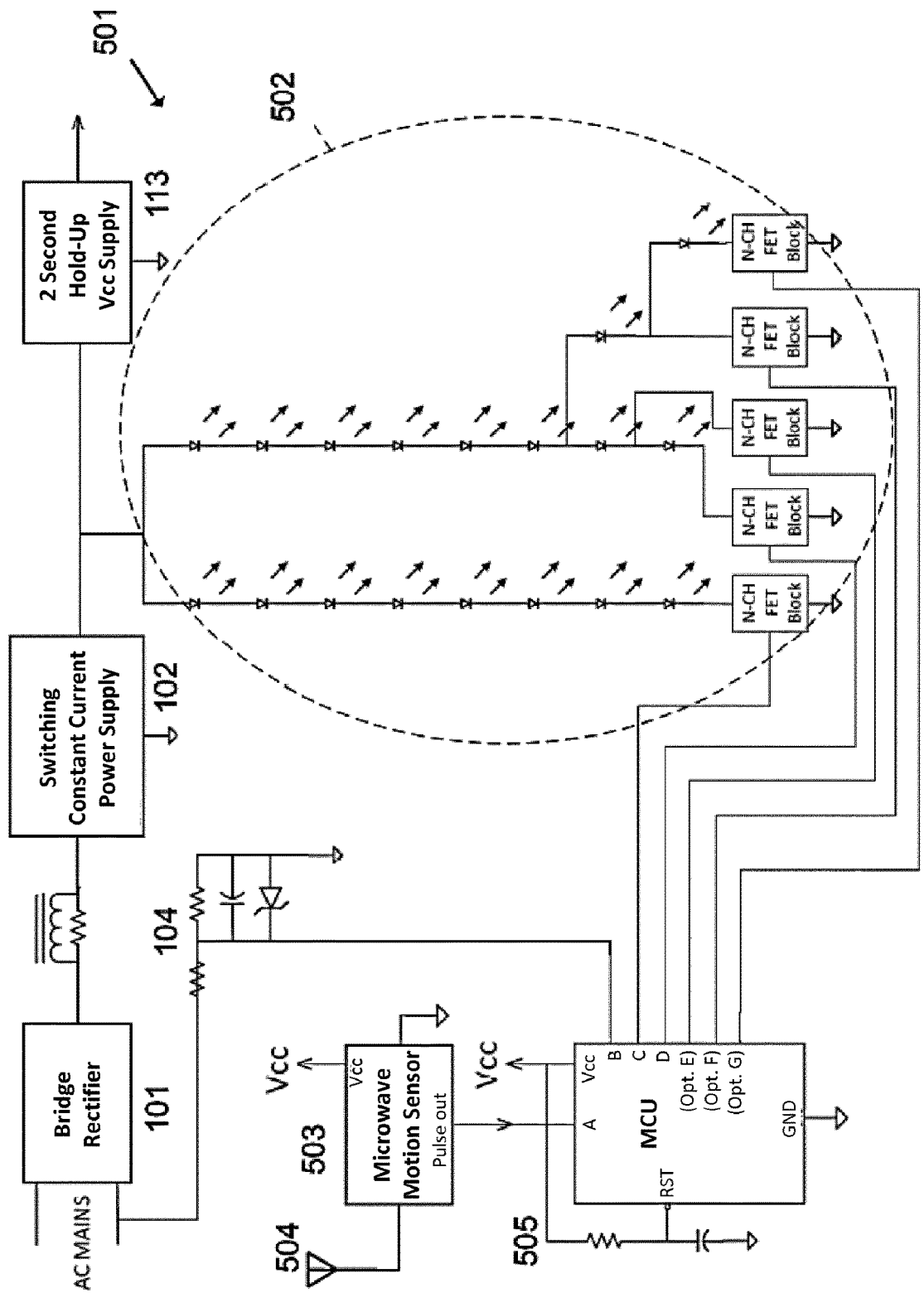
FIG. 5 shows an electrical circuit diagram in accordance with an example of the present disclosure.

FIG. 5 shows another electrical circuit diagram 501 of a horticultural lighting device in accordance with the present disclosure. Many of the features as disclosed in FIG. 5 correspond to the features in FIG. 1 and are therefore indicated with the same reference numeral.

The lighting unit 502 is arranged for providing illumination in accordance with one of a plurality of modi, wherein, for each modus, said lighting unit is arranged for illuminating in different electromagnetic spectrums. In this particular case, the lighting unit 502 is arranged to provide illumination in five different modi. This is indicated with the five N-CH Fet blocks. Here, the left LED string may be indicates as "white/motion" and the left LED string may be indicates as "color/grow", Different from the embodiment shown in FIG. 1 is that a motion detector 503, e.g. a microwave motion sensor, is provided. The motion sensor 503 is arranged for detecting motion in its vicinity.

The power supply 101 accommodates the desired AC mains input voltage range and converts it to a constant current, at a voltage high enough to accommodate the LED strings of the lighting unit 502.

As shown in FIG. 1, the power supply is composed of a bridge rectifier 101 and filtering to prevent EMI from being conducted from the switching supply 102 back into the mains power source. The switching constant current power supply 102 filters and converts the high rectified mains voltage to a required voltage in the following LED strings of the lighting unit 502, at a substantially constant current, powering the selected LED string. It also powers a ten-second hold-up power supply 113 for the controller and the motion detector 503.

The controller may be a tiny integrated circuit, 4-I/O microcontroller or Main Control Unit, MCU, and is reset at power-on by an R/C circuit until the power source and MCU internal processes are stable. The clock oscillator within the MCU may provide a stable frequency for an internal software timer, providing a no-motion exit delay before the light source switches back to grow lighting. The power drop-out, pulse shaping circuit 104 is able to shape interruptions to the mains supply produced by a user's intentionally-rapid power switch on/off switching to toggle control functions into the MCU, to set the exit delay to 5, 30, 60, 120 seconds, for example.

The motion detector 503, i.e. the Microwave Motion Sensor (MMS), may be similar to an integrated RCWL-0516-type microwave sensor circuit board. It may contain a circuit-board integrated antenna 504, and microwave oscillator/and receiver mixer, a low-pass, doppler-frequency filter and amplifier/discriminator producing an output pulse whenever the doppler signal reflected by a moving target exceeds a threshold. The output of the MMS may feed one or more 5-second motion-detected pulses to the controller I/O to control its operation.

Software in the controller may create an exit-delay counter which may be reset by the 5-second pulses from the motion detector 503. Upon motion detection, the counter may be reset to zero, then it immediately starts to count on cessation of the pulses. It also may set the controller output C to logic high which activates one of the N-channel FET's, which in-turn pulls the last LED in the corresponding white, display LED string to ground. That enables that particular LED string. Through software, the other LED switch controller outputs, D through G are simultaneously brought low to disable whichever grow spectrum had previously been enabled through its respective FET switch, when the room was vacant. When no motion is detected long enough for the counter to time-out, the controller may set C low, disabling the white LEDs and reset to high, the previously-selected output from D through G that had enabled the FET for the vacant-room grow spectrum. This will re-connect the low end of the grow spectrum LED string to ground, lighting that string of LEDs while the room is vacant.

Reset circuit 505 may be provide a low pulse to the micro controller unit at power-up, to initiazlize all internal circuitry and registers, and start the controller in an orderly manner.

It is noted that the strings of LED's can be combinations of different wavelengths. A string may create a particular spectrum, which can be altered by switching other LED's in and out of. Instead of switching in/out strings of LEDs, the horticultural lighting device can also be configured to switch in/out arrays of LEDs.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A horticultural lighting device for sustaining indoor plant growth, wherein said horticultural lighting device comprises:
   a lighting unit arranged for providing illumination in accordance with one of a plurality of modi, wherein, for each modus, said lighting unit is arranged for illuminating in different electromagnetic spectrums;
   a power unit arranged for receiving a mains supply voltage and for providing power to said lighting unit;
   a control unit arranged for detecting interruptions in the received AC mains supply voltage and for switching to a next modus within said plurality of modi for said lighting unit triggered by detected interruptions, wherein the next modus is selected based on a duration of at least one detected interruption of the detected interruptions or a particular sequence of the detected interruptions in the received AC mains supply voltage.

2. The horticultural lighting device in accordance with claim 1, further comprising a motion detector arranged for detecting moving objects, wherein the control unit is arranged for switching to a motion modus within said plurality of modi for said lighting unit trigged by detecting a moving object by said motion detector.

3. The horticultural lighting device in accordance with claim 2, wherein, in said motion modus, said lighting unit is arranged for providing illumination having a substantially broadband electromagnetic spectrum component.

4. The horticultural lighting device in accordance with claim 2, wherein said motion detector is arranged to operate according to at least one of:
   a Doppler effect noticeable between transmitted and received radio waves;
   a fluctuation in a received signal strength of received radio waves.

5. The horticultural lighting device in accordance with claim 2, wherein said control unit is arranged for switching to said motion modus, from a grow modus, for a predetermined amount of time triggered by detecting of said moving object by said motion detector.

6. The horticultural lighting device in accordance with claim 5, wherein said control unit is arranged to switch back to said grow modus after said predetermined amount of time.

7. The horticultural lighting device in accordance with claim 1, wherein, in one or more of said plurality of modi, said lighting unit is arranged for providing illumination having at least one of:
- a substantially blue based electromagnetic spectrum component,
- a substantially deep red based electromagnetic spectrum component,
- an ultraviolet, UV, supplemented electromagnetic spectrum component, and
- a substantially far-red supplemented, deep-red based electromagnetic spectrum component.

8. The horticultural lighting device in accordance with claim 1, wherein said lighting unit comprises a string of LEDs, and a plurality of switches, wherein each of said plurality of switches is arranged for introducing, or removing, one or more LEDs to said string of LEDs, and wherein said control unit is arranged for activating one or more of said plurality of switches for selecting a modus of said plurality of modi.

9. The horticultural lighting device in accordance with claim 1, wherein said lighting device further comprises:
- an electrical supply unit arranged for storing electrical energy and for providing power to the control unit of said horticultural lighting device during interruptions occurring in said AC mains supply voltage.

10. The horticultural lighting device in accordance with claim 1, wherein said control unit is further arranged for determining the duration of the at least one detected interruption of the detected interruptions in said received AC mains supply voltage, and:
- setting a predefined modus of said plurality of modi when said determined duration is within a predefined range from a first predetermined duration to a second predetermined duration and the mains voltage is subsequently interrupted for a second time meeting with a second determined duration of the subsequent interruption in said AC mains supply voltage within said predetermined range;
- setting a next modus of said plurality of modi when said determined duration is within a next range from a third predetermined duration to a fourth predetermined duration.

11. The horticultural lighting device in accordance with claim 1, wherein said device further comprises:
- a memory for storing a most recently set modus for said lighting unit, and
- wherein said control unit is further arranged for retrieving said most recently set modus from said memory, and for setting said lighting unit in said most recently set modus, when triggered by applying said mains supply voltage to said device.

12. The horticultural lighting device in accordance with claim 1, wherein said control unit is further arranged for detecting the particular sequence of interruptions in said received AC mains supply voltage, and for setting an initial modus of said plurality of modi upon detecting the particular sequence.

13. A horticultural lighting system arranged for sustaining indoor plant growth, wherein said horticultural lighting system comprises:
- the horticultural lighting device in accordance with claim 1, and;
- a switch for switching said AC mains supply voltage.

14. A method of operating a horticultural lighting device, wherein said method comprises the steps of:
- providing, by a lighting unit, illumination in accordance with one of a plurality of modi, wherein, in each modus, said lighting unit is arranged for illuminating in different electromagnetic spectrums;
- receiving, by a power unit, an Alternating Current, AC, mains supply voltage and providing, by said power unit, power to said lighting unit;
- detecting, by said control unit, interruptions in said received AC mains supply voltage and, switching, by said control unit, to a next modus within said plurality of modi for said lighting unit triggered by detected interruptions, wherein the next modus is selected based on a duration of at least one detected interruption of the detected interruptions or a particular sequence of the detected interruptions in the received AC mains supply voltage.

15. A computer program product comprising a non-transitory computer readable medium having instructions which, when executed by the horticultural lighting device, causes the horticultural lighting device to implement the method in accordance with claim 14.

16. A horticultural lighting device for sustaining indoor plant growth, wherein said horticultural lighting device comprises:
- a lighting unit arranged for providing illumination in accordance with one of a plurality of modi, wherein, for each modus, said lighting unit is arranged for illuminating in different electromagnetic spectrums;
- a power unit arranged for receiving a mains supply voltage and for providing power to said lighting unit;
- a control unit arranged for detecting interruptions in the received AC mains supply voltage via a detection circuit and for switching to a next modus within said plurality of modi for said lighting unit triggered by detected interruptions.

17. The horticultural lighting device in accordance with claim 16, further comprising a motion detector arranged for detecting moving objects, wherein the control unit is arranged for switching to a motion modus within said plurality of modi for said lighting unit trigged by detecting a moving object by said motion detector.

18. The horticultural lighting device in accordance with claim 17, wherein, in said motion modus, said lighting unit is arranged for providing illumination having a substantially broadband electromagnetic spectrum component.

19. The horticultural lighting device in accordance with claim 17, wherein said motion detector is arranged to operate according to at least one of:
- a Doppler effect noticeable between transmitted and received radio waves;
- a fluctuation in a received signal strength of received radio waves.

20. The horticultural lighting device in accordance with claim 17, wherein said control unit is arranged for switching to said motion modus, from a grow modus, for a predetermined amount of time triggered by detecting of said moving object by said motion detector.

* * * * *